Patented Feb. 21, 1928.

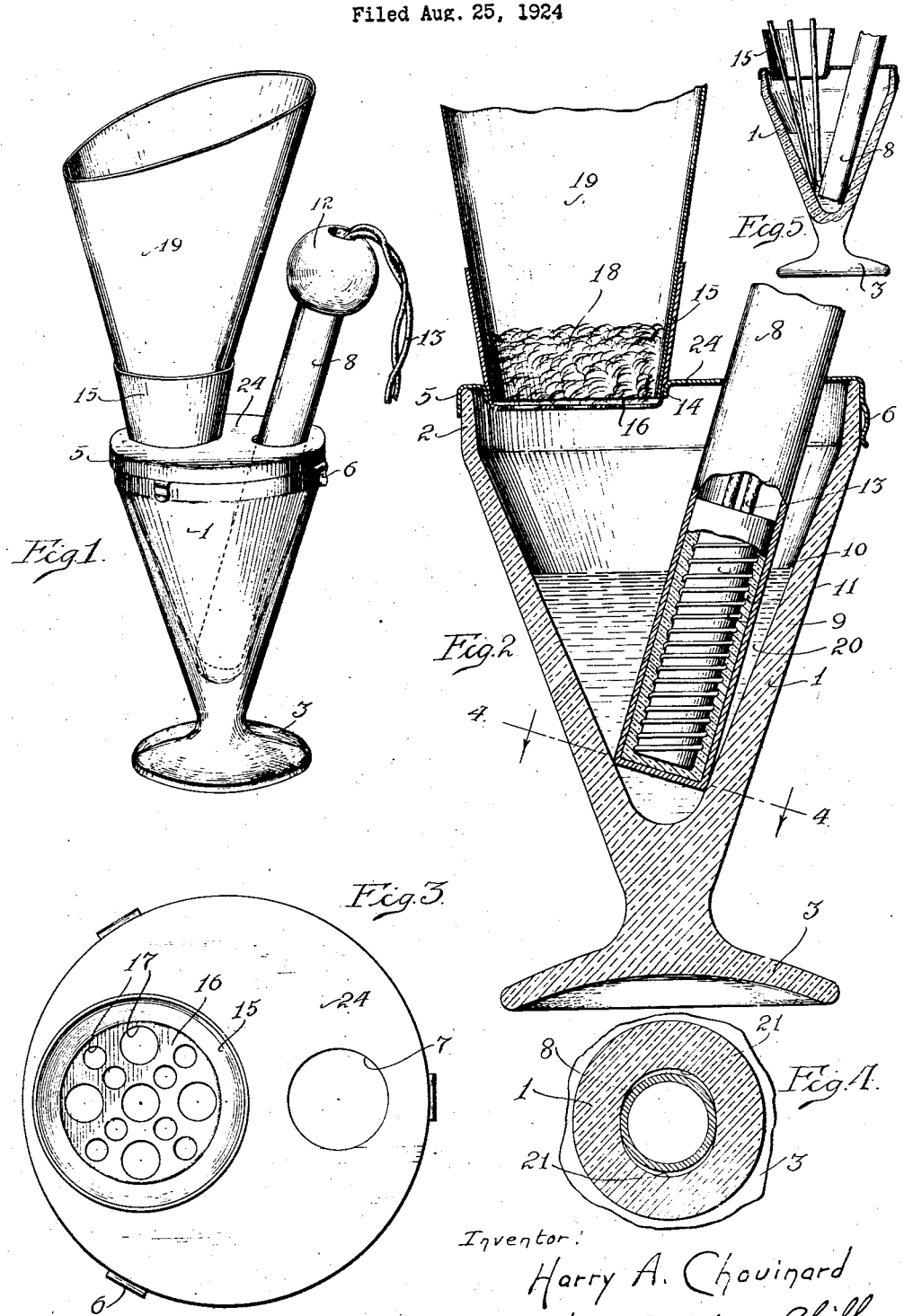

1,659,970

UNITED STATES PATENT OFFICE.

HARRY A. CHOUINARD, OF MAYWOOD, ILLINOIS.

ELECTRIC INHALER.

Application filed August 25, 1924. Serial No. 733,899.

My invention relates to electrically operated vaporizers and in one of its pertinent applications aims to provide a simple, easily manufactured, inexpensive and highly sanitary appliance adapted to effect a speedy vaporization of any desired liquid and arranged so as to compel the resulting vapor to issue through a medicated cotton.

Viewed in some of its important aspects, my invention aims to provide a vaporizer in which the vaporizable liquid is disposed in a transparent container so that the level of the liquid can always be observed, and in which the cross-section of the container is greatly restricted adjacent to the heating member of the appliance so as to expedite the vaporization. It also aims to provide such a container with a detachable cover through which the heating member can readily be inserted or withdrawn, aims to provide a detachable cup normally supported by the cover and having a suitably perforated bottom, and aims to shape this cup so that it will be adapted to hold a vapor confining cone in a convenient position for use.

Furthermore, my invention aims to provide the cover of the appliance with suitable means for firmly retaining it on the container, and aims to provide a complete and compact inhaler in a construction in which every part of the same can readily be cleaned so as to maintain the entire appliance in a highly sanitary condition. My invention also aims to provide an appliance of this class so arranged that the cone holder or the cup (or both) can readily be detached to permit the insertion of objects either through the corresponding opening in the cover or the perforations in the bottom of the cup into the liquid in the container, thereby affording a highly convenient and speedily operating appliance for sterilizing surgical or dental instruments or the like. Still further and also more detailed objects will appear from the following specification and from the accompanying drawings, in which Fig. 1 is a perspective view of an electric inhaler embodying my invention.

Fig. 2 is an enlarged central and vertical section through the same, with the upper portions of the paper cone and of the heating member broken away.

Fig. 3 is a plan view of the cover, drawn on the same scale as Fig. 2, with the detachable cup in its normal position.

Fig. 4 is a section taken along the line 4—4 of Fig. 2 to show the spaces between the lower end of the heating member and the bore of the container.

Fig. 5 is a section similar to Fig. 2, but with the cone and the cotton omitted, showing my appliance as used in sterilizing instruments.

While the appliance of my invention may be employed with equal facility for quite a variety of purposes, it is particularly adapted for use in vaporizing a liquid and causing the resulting vapor to pass through a medicated cotton, and for causing the resulting medicated vapor to issue through a cone adapted to confine the vapors to a desired direction. I am therefore illustrating and describing my invention in such an embodiment, although I do not wish to be limited to any particular use of the same.

In the illustrated form, my appliance comprises a liquid container which is desirably made of glass and which preferably has a downwardly tapering conical wall portion 1 adapted to afford a restricted horizontal section near the bottom of its interior. The container also desirably has a substantially cylindrical upper end portion 2 and a base 3 of adequate size for affording the desired stability.

When in use, the mouth of the container is closed by a cap 4 which has at its periphery a depending collar 5 of such a size as to afford a fairly snug fit over the mouth portion 2 of the container. This flange 5 desirably has a number of downwardly directed spring fingers 6 formed in extension of it and pressing tightly against the exterior of the container when the cover is attached, so as to prevent the cover from being tilted out of its normal position when the inhaler is in use.

In forming the cover, I provide it with an aperture 7 of a bore closely approaching the diameter of the metal casing 8 of an electric heater. This heater casing is here shown as housing a resistance wire 9 wound on an insulating core 10 and spaced from the metal casing 8 of the heating member by an insulating filling 11; the heater is also shown as having at its upper end an insulating knob 12 which affords a cool handle for manipulating the heating member and through which twin wires 13 pass from the high resistance wire 9 to any suitable source of current.

In addition to the aperture 7, the cover 4 is provided with another and desirably larger aperture which preferably is bordered by a downwardly directed flange 14. This flange affords a socket for the lower portion of a metal cup having a tapering side 15 adapted to fit into the said flange 14 and having a perforated bottom 16 adapted to support the cotton 18 to which the desired medicine is applied. To secure an adequate support for the cotton while permitting vapors from within the glass container to reach the cotton freely, I desirably provide the bottom 16 with a considerable number of perforations 17, some of which perforations are preferably of a considerable size.

In connection with the appliance as thus described, I also supply paper cones 19, each of which cones is open at the bottom and has its side wall conforming in taper to that of the cup wall 15, so as to fit snugly into the cup after the manner shown in Figs. 1 and 2. The paper cone thus employed also desirably has its upper end inclined to its bottom or smaller end, so as to lend itself more readily to the application of vapors through the cone to the mouth and nose of the user. When the appliance as thus described is to be used, the vaporizable liquid 20 is poured into a glass container in a quantity varying with the length of time during which the inhaler is to be employed. In practice, water is generally used for this purpose and the quantity required for ordinary treatments may only correspond to a small fraction of the capacity of the container, as I preferably employ a container of such a capacity as to be adapted also for other uses than in connection with inhalations.

When the cover is attached and the heating member is inserted through the said perforation 7, the lower end of this heating member, or the end in which the heating wire is disposed, is surrounded by the liquid in the restricted lower portion of the interior of the container, thereby presenting a quite large heating surface in proportion to the amount of the adjacent water or other liquid. Owing to this relatively large heating radiating area, the resulting vaporization is quite rapid even when the heater employed is of a relatively small wattage, so that I can readily start vaporization within a very few minutes. Moreover, by placing the cover perforation 7 at one side of the axis of the container, I cause the heating member to be tilted, so that its bottom is in a plane in which the bore of the glass container has an elliptical section as shown in Fig. 4. Consequently, the heat at the extreme bottom of the heating member is applied to the very restricted amount of water in the crescent shaped passages 21 of Fig. 4, thereby starting the vaporization within an unusually small time interval after the current is turned on.

I claim as my invention:—

1. An electric vaporizer including a liquid container having a substantially conical interior, a top for the container having a vapor outlet and having an opening, and an electric heater having a cylindrical casing closed at its bottom and being receivable through said opening, the diameter of the apex portion of the container interior and that of the heater casing being proportioned so that the casing bottom will be engaged by the tapering walls of the container interior to hold the casing bottom adjacent to the bottom of the container interior and thereby adjacent to the bottom of the liquid, said opening of the container top being disposed adjacent to the periphery of the container so as to hold the heater casing bottom at an angle to the plane of the bottom of the container whereby to provide opposite substantially crescent shaped and narrow passages between the casing bottom and the adjacent parts of the interior wall of the container.

2. An electric vaporizer including a liquid container having a substantially conical interior, a top for the container having a vapor outlet and having an opening, and an electric heater having a casing closed at its bottom and being receivable through said opening, the diameter of the apex portion of the container interior and that of the heater casing being proportioned so that the casing bottom will be engaged by the tapering walls of the container interior to hold the casing bottom adjacent to the bottom of the container interior and thereby adjacent to the bottom of the liquid, the container interior and casing being relatively shaped so as to provide a passage for the fluid above and below the casing bottom, the said opening of the container top being disposed adjacent to the container periphery so as to maintain the heater casing at an angle to the plane of the container bottom and close to the adjacent side wall of the container interior.

Signed at Chicago, Illinois, Aug. 20th, 1924.

HARRY A. CHOUINARD.